United States Patent

Kochi et al.

Patent Number: 6,034,989
Date of Patent: Mar. 7, 2000

[54] SPREAD-SPECTRUM COMMUNICATION DEVICE

[75] Inventors: Tetsuya Kochi, Mukoh; Hiroaki Tanaka, Mishima-gun, both of Japan

[73] Assignee: Murata Manufacturing Co., Ltd., Japan

[21] Appl. No.: 08/942,796

[22] Filed: Oct. 2, 1997

[30] Foreign Application Priority Data

Oct. 2, 1996 [JP] Japan .................................. 8-261876

[51] Int. Cl.⁷ .................................................. H04B 1/69
[52] U.S. Cl. ........................ 375/207; 375/350; 455/307
[58] Field of Search ................................. 375/346, 350, 375/207; 455/307; 364/724.011, 724.16, 825

[56] References Cited

U.S. PATENT DOCUMENTS

| | | | |
|---|---|---|---|
| 5,268,927 | 12/1993 | Dimos et al. | 375/206 |
| 5,377,226 | 12/1994 | Davis | 370/342 |
| 5,422,912 | 6/1995 | Asser et al. | 375/350 |
| 5,523,725 | 6/1996 | Ishikawa et al. | 333/17.2 |
| 5,596,600 | 1/1997 | Dimos et al. | 375/206 |

FOREIGN PATENT DOCUMENTS 2274374  7/1994  United Kingdom .

OTHER PUBLICATIONS

Jones W. W. et al.: "Narrowband Interference Suppression Using Filter–Bank Analysis/Synthesis Techniques" Communications–Fusing Command, Control and Intelligence, San Diego, Oct. 11–14, 1992, vol. 3, No. Conf. 11, Oct. 1992, pp. 898–902.
European Search Report dated Aug. 26, 1999.

*Primary Examiner*—Stephen Chin
*Assistant Examiner*—Lenny Jiang
*Attorney, Agent, or Firm*—Ostrolenk, Faber, Gerb & Soffen, LLP

[57] ABSTRACT

A spread-spectrum communication device which substantially eliminates a narrow-band interfering signal contained in a spread signal over a wide range of frequency and which presents a good S/N ratio in a despread signal. A magnetostatic filter is used to limit the narrow-band interfering signal along with part of the spread signal. The limited spread signal and narrow-band interfering signal are despread by a matched filter. A plurality of correlation peaks, which are derived from the same symbol in the spread signal and are contained in the despread signal, are synthesized in a rake synthesizer or a post-detection integrator receiver.

13 Claims, 6 Drawing Sheets

SPREAD-SPECTRUM COMMUNICATION DEVICE

BACKGROUND OF THE INVENTION

1. Field of the Invention

The present invention relates to a communication device, in particular to a spread-spectrum communication device capable of eliminating a narrow-band interfering signal.

2. Description of the Related Art

Spread-spectrum techniques expand bandwidth to gain transmission advantages. At a transmitter, pseudorandom spreading distributes the transmitter's power over a much wider frequency range, with much more power density. Because the spreading is reversed at a receiver, narrow-band interfering signals are spread before demodulation, and wide-band interfering signals remain wide-band. The interference power density in the reconstructed narrow band remains low, while the higher power density of the desired signal is available to the receiver demodulator. Therefore, interference is reduced.

Figure 7:
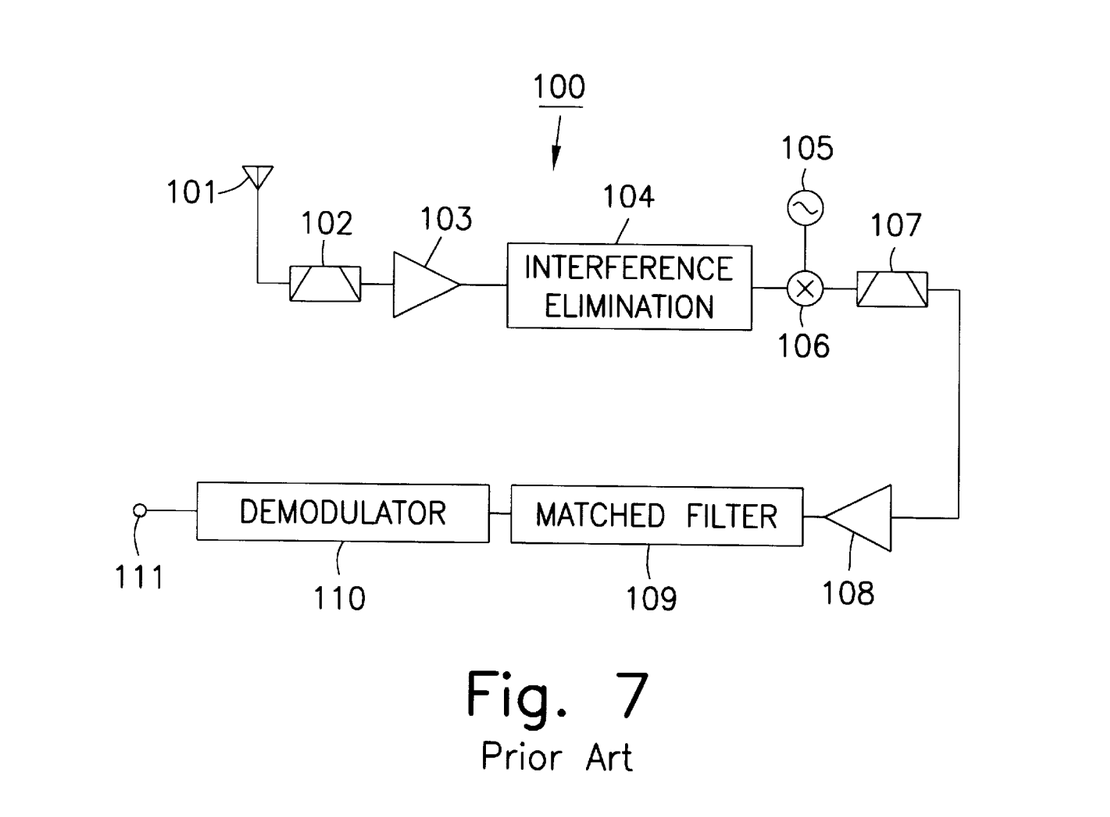
FIG. 7 is a block diagram of a conventional spread-spectrum communication device.

FIG. 7 shows one example of a conventional spread-spectrum communication device. The spread-spectrum communication device 100 includes an antenna 101 for receiving a spread signal, a bandpass filter 102, an amplifier 103, a circuit 104 for eliminating a narrow-band interfering signal, a local signal source 105, a mixer 106, a bandpass filter 107, an amplifier 108, a matched filter 109 for reversing the spread signal, a demodulator 110, and an output terminal 111.

Figure 8:
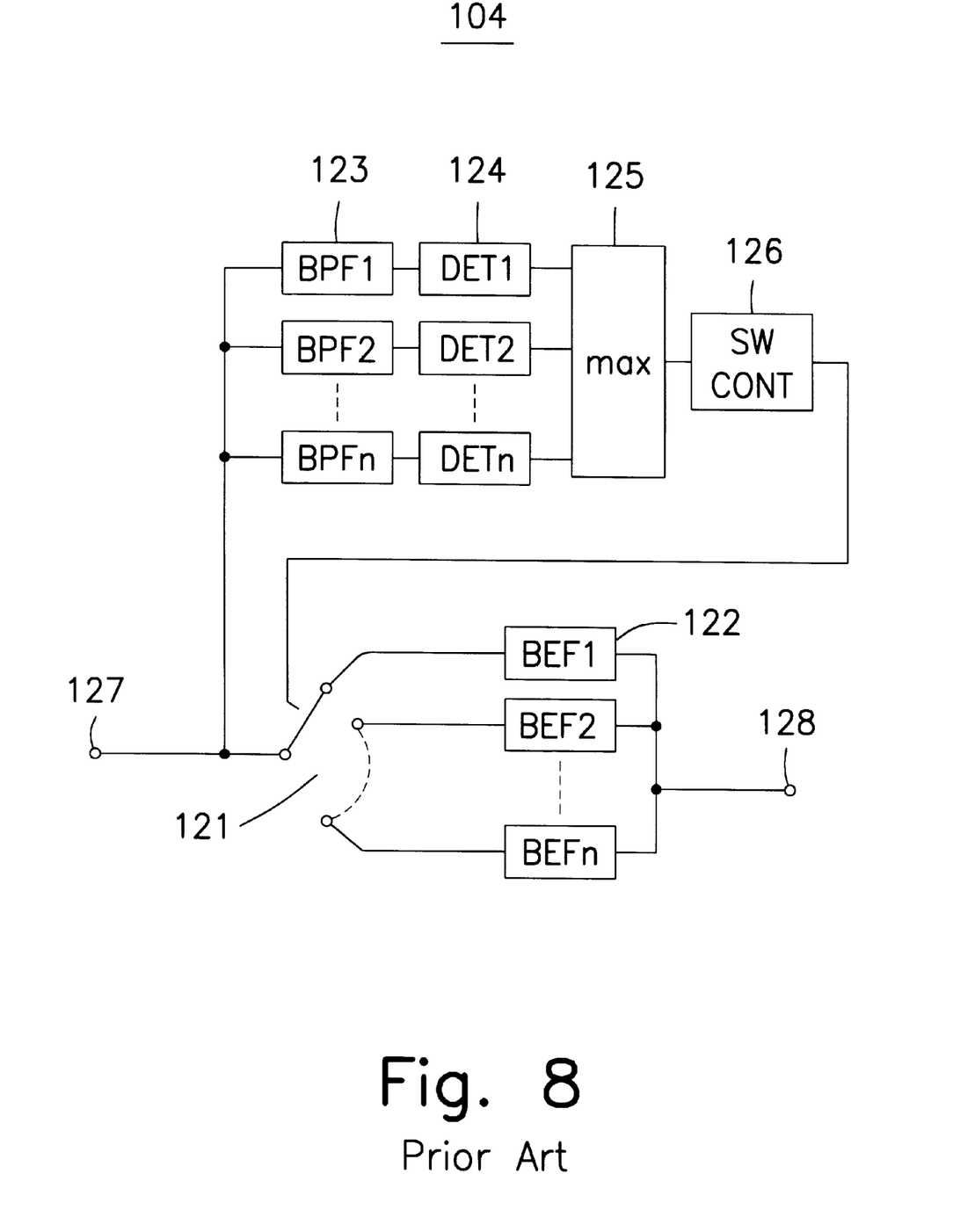
FIG. 8 is a block diagram of a narrow-band interfering signal eliminating circuit in the spread-spectrum communication device of FIG. 7.

FIG. 8 shows one example of the eliminating circuit 104 which includes a switch 121, band elimination filters BEF1–BEFn, bandpass filters BPF1–BPFn, detectors DET1–DETn, a circuit 125 for determining a maximum-value of the outputs of the detectors DTE1–DTEn, a switching circuit 126, an input terminal 127, and an output terminal 128. The inputs of bandpass filters BPF1, BPF2, . . ., BPFn, are together connected to the input terminal 127, and their outputs are connected to the determining circuit 125 via the respective detectors DET1, DET2, . . ., DETn. The switch 121 has its input connected to the input terminal 127 and a plurality of outputs connected to the filters BEF1, BEF2, . . ., BEFn. The outputs of the band elimination filters are connected together to the output terminal 128. The groups of band elimination filters 122, the bandpass filters 123, and the detectors 124 respectively include the same number of filters.

In the spread-spectrum communication device 100, a signal received by the antenna 101 is fed to the bandpass filter 102 in which unnecessary frequency components of the signal are removed. The signal is then amplified by the amplifier 103, and fed to the circuit 104.

In the circuit 104, respective band pass filters have different frequency bands, and the bands of adjacent filters are consecutive. As a result, band pass filters BPF1–BPFn, as a whole, pass any signal as long as the frequency of the signal is within the spread frequency band. Similarly, the respective band elimination filters eliminate signals in respective frequency bands.

Further, in the respective couples of band pass and band elimination filters, e.g. BPF1–BEF1, BPF2–BEF2 . . ., both of the filters have same band.

An input spread signal from the terminal 121 proceeds to the band pass filters. Then, the detectors detect levels of the spread signal at their own band frequency. The circuit 125 determines a signal having a maximum level among the output signals from the detectors. In response to the determination, the switch 121 controls the switch to feed the input signal into a band elimination filter which corresponds to the band pass filter whose output has the maximum signal level.

Assuming that the level of an interference signal is extremely larger than the level of the spread signal, the interference signal can be eliminated by the above-process.

The signal is input to the frequency converter 106 via the output terminal 128, and further input to the bandpass filter 107 to remove unnecessary frequency components. The signal is then amplified by the amplifier 108, and despread by the matched filter 109, demodulated by the demodulator 110, and then output to the output terminal 111.

The narrow-band interfering signal eliminating circuit 104 involves a number of bandpass filters and band elimination filters, which are costly and increases space requirements. When the number of narrow-band interfering signals is more than one with their frequencies dispersed among different bands, only the highest level interfering signal is eliminated, with the remaining ones left unprocessed. The S/N ratio of the despread signal is thus degraded.

SUMMARY OF THE INVENTION

Accordingly, an advantageous feature of the present invention is to provide a spread-spectrum communication device that is low-cost and compact and presents an excellent S/N ratio despread signal using a narrow-band interfering signal eliminating circuit covering a wide frequency band.

To achieve the above feature, the spread-spectrum communication device of the present invention comprises a first circuit for receiving a spread signal, a second circuit for eliminating a narrow-band interfering signal contained in the spread signal, and a third circuit for despreading the spread signal, wherein the second circuit includes a variable amplification-factor amplifier and a magnetostatic filter that functions as a filter for limiting the level of the spread signal along a frequency axis and wherein the third circuit for despreading the spread signal comprises a matched filter for despreading the spread signal and a delay synthesizing circuit, connected to the matched filter, for synthesizing a plurality of correlation peaks derived from the same symbol within the despread signal.

In the spread-spectrum communication device of the present invention, the delay synthesizing circuit may be a rake synthesizer.

In the spread-spectrum communication device of the present invention, the delay synthesizing circuit may also be a post detection integrator receiver.

BRIEF DESCRIPTION OF THE DRAWINGS

FIGS. 2A–2C show the process of eliminating a narrow-band interfering signal by the spread-spectrum communication device.

DETAILED DESCRIPTION OF EMBODIMENTS OF THE INVENTION

Figure 1:
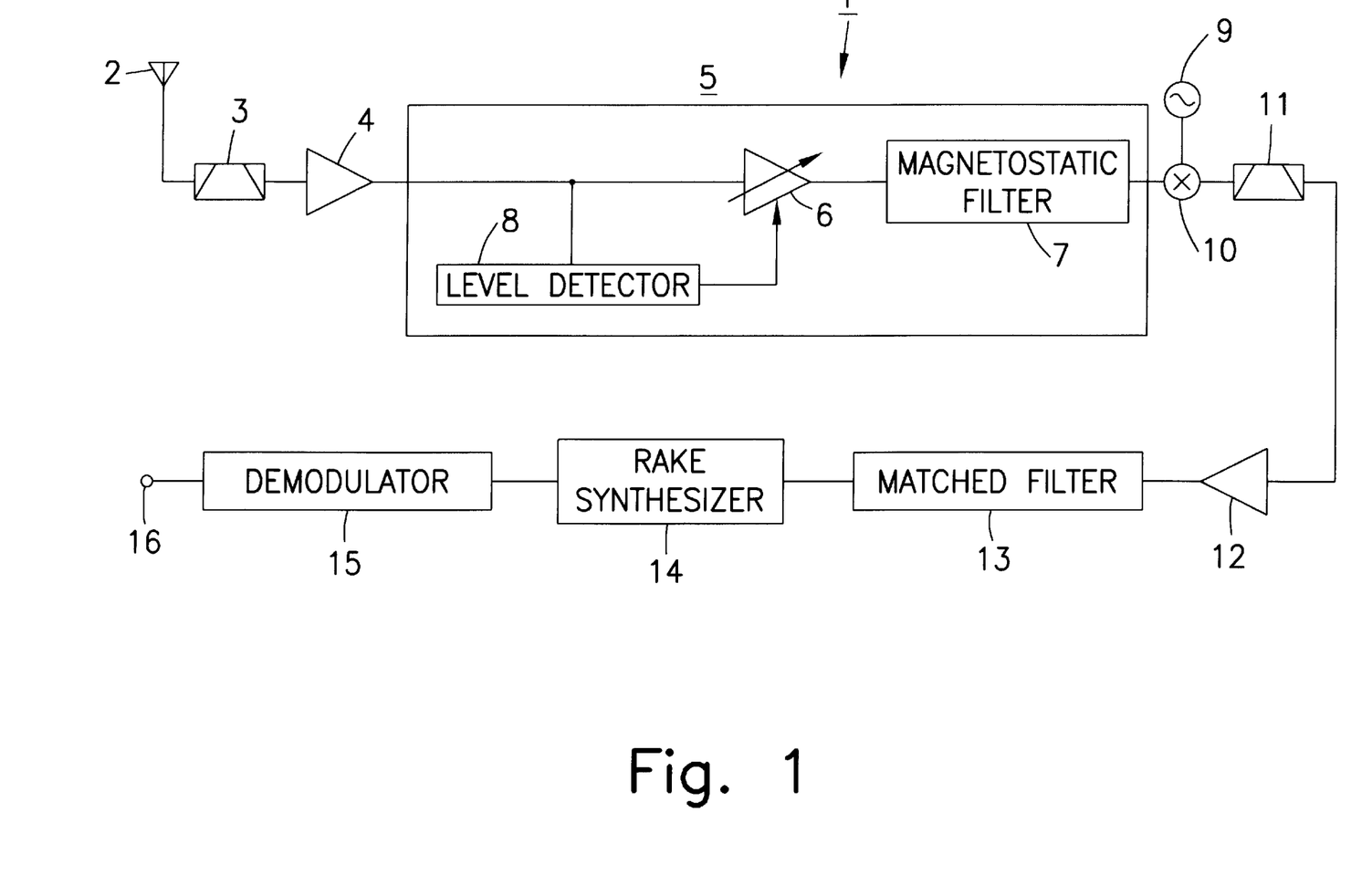
FIG. 1 is a block diagram showing one embodiment of the spread-spectrum communication device of the present invention.

FIG. 1 shows one embodiment of the spread-spectrum communication device of the present invention. An antenna 2 is connected to a circuit 5 for eliminating a narrow-band interfering signal, via a bandpass filter 3 and amplifier 4. An output of the circuit 5 is connected to a mixer 10, and an output of a local signal source 9 is also connected to the mixer 10. An output of the mixer 10 is connected to the rake synthesizer 14 via the bandpass filter 11, amplifier 12 and matched filter 13. The output of the rake synthesizer 14 is connected to the output terminal 16 via the demodulator 15.

The circuit 5 includes a magnetostatic filter 7. It has a variable frequency region in which it has saturating characteristics in accordance with the strength of a magnetic field applied from the exterior. The device suppresses an input signal having a power level larger than its saturation level. On the other hand, the device presents linear transparency to an input signal whose power level is lower than its saturation level. Thus, by adjusting a level of a desired spread signal to be under the saturation level, the power of an interference signal can be selectively decreased.

In the circuit 5, the input line is divided into two branches. At one branch, the input is presented to the variable amplification-factor amplifier 6 and magnetostatic filter 7. At the other branch, the input is presented to the level detector 8 and its output is presented to the control terminal of the variable amplification-factor amplifier 6.

In the spread-spectrum communication device 1, a signal received by the antenna 2 is fed to the bandpass filter 3 where its unnecessary frequency components are removed. The signal is then amplified by the amplifier 4, and fed to the circuit 5.

Then, the signal is further amplified by the variable amplification-factor amplifier 6, and is then fed to the magnetostatic filter 7, where the input signal above its saturation level is limited along the frequency axis. The level detector 8 checks the level of the spread signal, and controls the variable amplification-factor amplifier 6 so that the level of the spread signal is slightly higher than the saturation level of the magnetostatic filter 7.

Figure 2A:
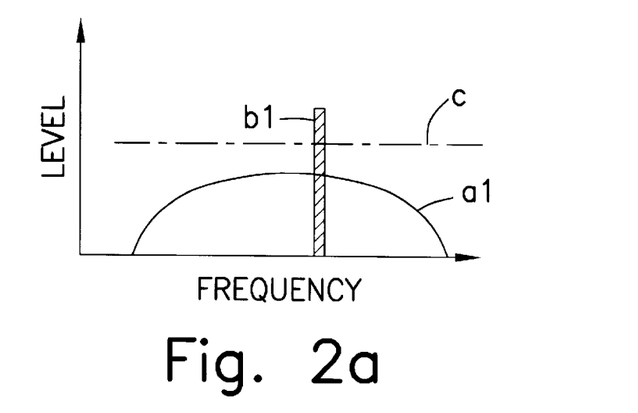
FIG. 2A shows the spectrum of a signal presented to a variable amplification-factor amplifier.
Figure 2B:
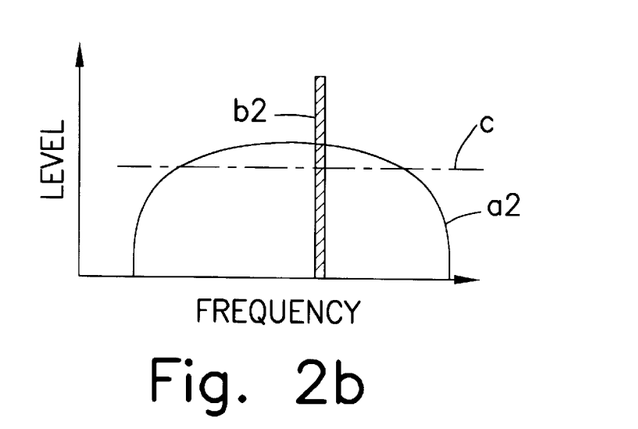
FIG. 2B shows the spectrum of a signal presented to a magnetostatic filter.
Figure 2C:
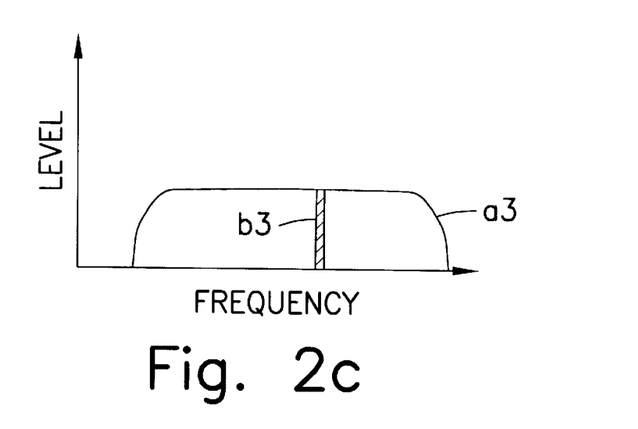
FIG. 2C shows the spectrum of a signal output by the magnetostatic filter.

FIG. 2A shows the spectrum of the signal input to the amplifier 6, wherein al represents a spread signal, b1 represents a narrow-band interfering signal, and c represents the saturation level of the magnetostatic filter 7. The level of the narrow-band interfering signal b1 is higher than the saturation level c of the magnetostatic filter 7. The level of the spread signal al is lower than the saturation level c of the magnetostatic filter 7. FIG. 2B shows the spectrum of the signal output from the variable amplification-factor amplifier 6, wherein a2 represents the spectrum signal, b2 represents the narrow-band interfering signal and c represents the saturation level of the magnetostatic filter 7. By the amplifier 6, the level of spread signal a2 is adjusted to a level slightly above the saturation level c of the magnetostatic filter 7. The narrow-band interfering signal b2 is also amplified by the same amplification factor. FIG. 2C shows the spectrum of the output of the magnetostatic filter 7, wherein a3 represents the spread signal and b3 represents the narrow-band interfering signal. The level of the spread signal a3 is limited to the saturation level of the magnetostatic filter 7.

To effectively reduce the level of the interfering signal b3 in a reversed signal, it is preferable to cut a part of the spread signal together with the interfering signal as described in FIG. 2C.

In the above method where the magnetostatic filter is used to limit the input signal with part of the spread signal limited, however, the group delay characteristics of the output spread signal are degraded and a solution to that problem is required.

Figure 3:
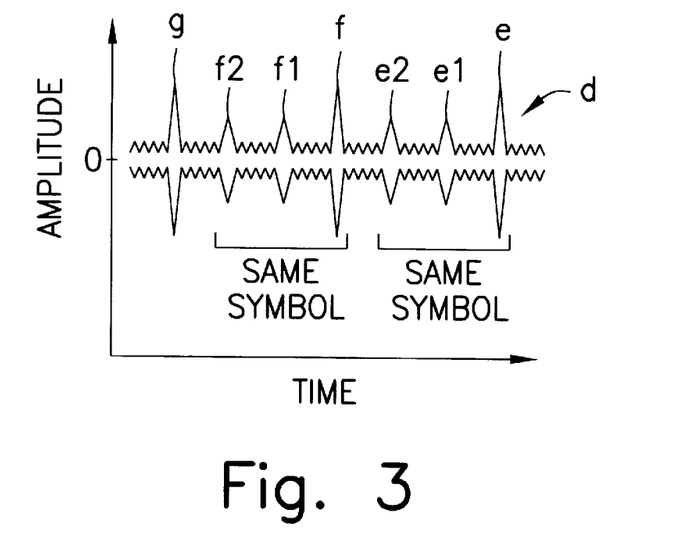
FIG. 3 shows the waveform of a despread signal output by a matched filter in the spread-spectrum communication device of FIG. 1.

The signal output from the circuit 5 is frequency-converted by mixer 10, and is then fed to the bandpass filter 11 where unwanted components of the signal are removed. The signal is then amplified by the amplifier 12, and is despread by the matched filter 13. FIG. 3 shows the waveform (correlation waveform) d of the signal despread by the matched filter 13. As shown, the abscissa represents time, with the right-hand side being prior to the left-hand side along the time axis. The ordinate represents voltage. The correlation waveform d contains large amplitude correlation peaks e, f, and g at regular intervals, each equal to the interval between symbols before spreading (namely, symbol time). Furthermore, two small amplitude correlation peaks el and e2 appear between the correlation peaks e and f, and two small amplitude correlation peaks f1 and f2 appear between the correlation peaks f and g. The correlation peaks el and e2 are derived from the same symbol from which the correlation peak e is also derived, and are produced when the spread signal degraded in group delay characteristics is despread through the matched filter 13. In the same way, the correlation peaks f1 and f2 are derived from the same symbol from which the correlation peak f is derived.

The signal despread by the matched filter 13 is presented to the rake synthesizer 14. The rake synthesizer 14 is a delay synthesizing circuit, which has a function of synthesizing a plurality of correlation peaks that take place when the spread signal degraded in group delay characteristics is despread by the matched filter 13.

Figure 4:
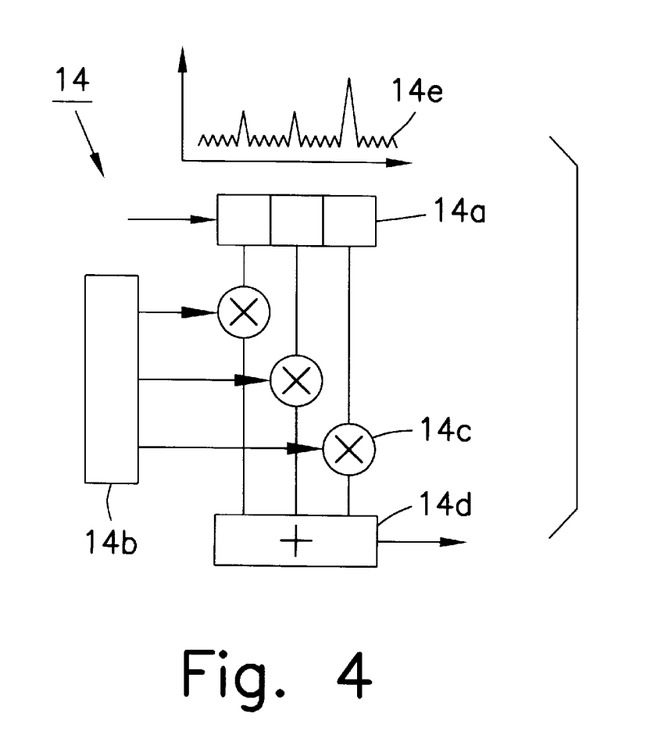
FIG. 4 is a block diagram of a rake synthesizer in the spread-spectrum communication device of FIG. 1.

FIG. 4 shows the construction of the rake synthesizer 14. The rake synthesizer 14 comprises a delay circuit 14a with taps, a tap coefficient generator 14b, and three multipliers 14c for multiplying the outputs of the delay circuit 14a and the respective outputs of the tap coefficient generator 14b, and an adder 14d for summing the outputs of the multipliers 14c. Indicated above the delay circuit 14a with the taps is the waveform 14e of the despread signal presented to the rake synthesizer 14.

The despread signal 14e is input to the delay circuit 14a with the taps, and the outputs of the correlation peaks delayed by the delay circuit 14a with the taps are respectively fed to the multipliers 14c. The tap coefficient generator 14b generates tap coefficients that are set to maximize S/N ratio in the output of the adder 14d, and presents them to the multipliers 14c. The correlation peak outputs multiplied by the respective tap coefficients at the multipliers 14c are fed to the adder 14d, where the three correlation peaks are summed for a maximum S/N ratio. The summed output is presented to the demodulator 15.

The demodulator 15 demodulates the input signal and outputs the demodulated signal to the output terminal 16.

In the elimination of the narrow-band interfering signal, the magnetostatic filter is used as a limiter. A group delay takes place as a result when the narrow-band interfering signal along with part of the spread signal is limited. A plurality of correlation peaks result from the group delay in the course of despreading. The rake synthesizer synthesizes the correlation peaks thereby increasing S/N ratio in the correlation waveform. This arrangement allows the saturation level of the magnetostatic filter to be set in a wide range, thereby facilitating the adjustment of the filter.

Figure 5:
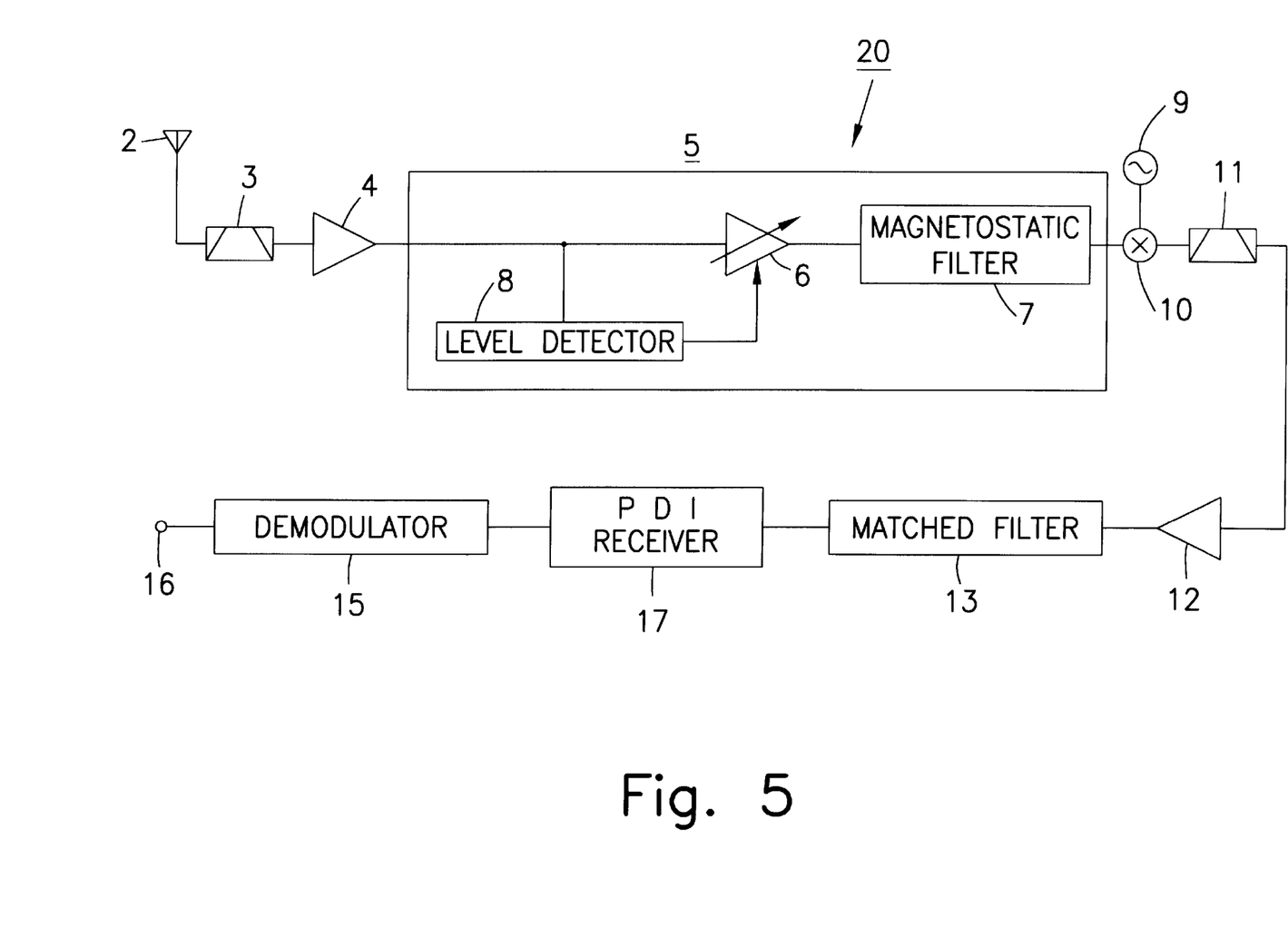
FIG. 5 is a block diagram showing another embodiment of the spread-spectrum communication device of the present invention.

FIG. 5 shows another embodiment of the spread-spectrum communication device of the present invention. In FIG. 5, components equivalent or identical to those described with reference to FIG. 1 are designated with the same reference numerals. The description of their construction and operation is not repeated. As shown, the difference between a spread-spectrum communication device 20 and the spread-spectrum communication device 1 is that a PDI (Post Detection Integrator) receiver 17 replaces the rake synthesizer 14 as the delay synthesizer, between the matched filter 13 and the demodulator 15.

Figure 6:
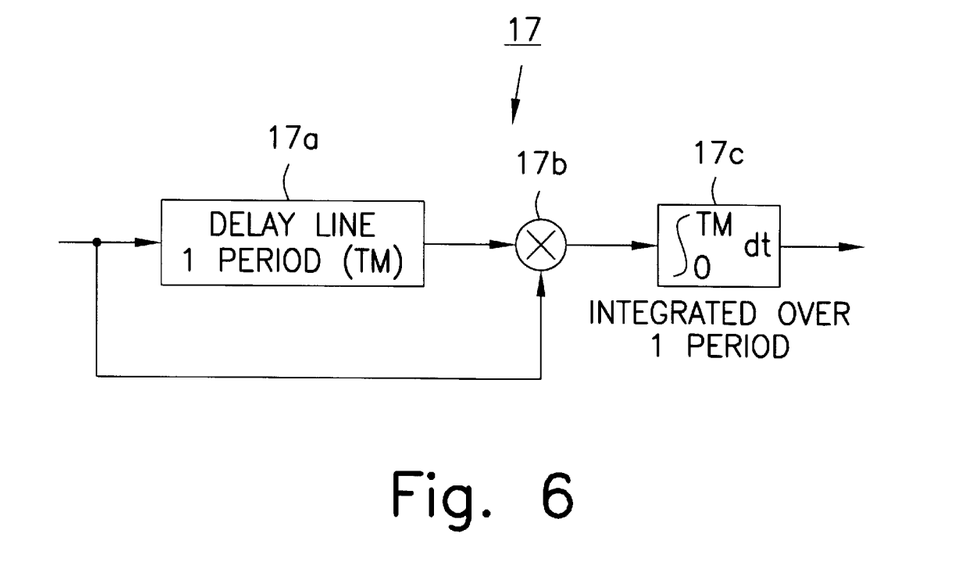
FIG. 6 is a block diagram of a post detection integrator (PDI) receiver in the spread-spectrum communications of FIG. 5.

FIG. 6 shows the construction of the PDI receiver 17. The PDI receiver 17 comprises a delay circuit 17a for delaying the despread signal by one symbol time, a multiplier 17b for multiplying the delayed despread signal by the non-delayed despread signal, and an integrator 17c for integrating the output of the multiplier 17b over the delay time.

The despread signal presented to the PDI receiver 17 is divided into two branches. At one branch, the signal is presented to the delay circuit 17a which delays the signal by one symbol time, and the delayed signal is applied to the multiplier 17b. The signal at the other branch is directly presented to the multiplier 17b. The multiplier 17b receives the current despread signal and the preceding despread signal one symbol time delayed. In the waveform of the despread signal shown in FIG. 3, the multiplier 17b receives both correlation peaks e and f at the same time, both e1 and f1 at the same time, and both e2 and f2 at the same time. The multiplier 17b multiplies both inputs. As a result, the multiplier 17b outputs a signal corresponding to the phase difference between two correlation waveforms having a difference of one symbol time therebetween. The output of the multiplier 17b is presented to the integrator 17c which integrates the input signal over one symbol time. A plurality of correlation peaks within one symbol time arising from the group delay of the spread signal are combined with corresponding peaks in adjacent symbols in the time axis in the form of a phase difference, and the phase difference signal is fed to the demodulator 15.

In the elimination of the narrow-band interfering signal, the magnetostatic filter is used as a limiter. A group delay takes place as a result of limiting the narrow-band interfering signal along with part of the spread signal. A plurality of correlation peaks result from the group delay in the course of despreading. The PDI receiver synthesizes the correlation peaks thereby increasing S/N ratio in the correlation waveform. This arrangement allows the saturation level of the magnetostatic filter to be set in a wide range, thereby facilitating the adjustment of the filter.

According to the spread-spectrum communication device of the present invention, the limiter feature of the magnetostatic filter in the frequency axis is used to remove the narrow-band interfering signal, and the interfering signal along with part of the spread signal is thus limited. A plurality of correlation peaks of the despread signal of the same symbol result when the limited spread signal is despread through the matched filter. By synthesizing the plurality of correlation peaks through the delay synthesizing circuit such as the rake synthesizer or PDI receiver, the S/N ratio of the correlation signal is heightened. This arrangement allows the saturation level of the magnetostatic filter to be set in a wide range, thereby facilitating the adjustment of the filter.

What is claimed is:

1. A spread-spectrum communication device comprising:

a first circuit which receives a spread signal comprising symbols, a second circuit which limits a narrow-band interfering signal contained in said spread signal, and a third circuit which despreads said spread signal, wherein said second circuit comprises a variable amplification-factor amplifier and a magnetostatic filter which limits the level of the spread signal as well as the narrow-band interfering signal along a frequency axis, and wherein said third circuit comprises a matched filter for which despreads said spread signal, thereby producing a plurality of correlation peaks corresponding to said symbols in said spread signal, and a delay synthesizing circuit, connected to said matched filter, which synthesizes a plurality of said correlation peaks derived from a single said symbol within the despread signal.

2. A spread-spectrum communication device according to claim 1, wherein said delay synthesizing circuit is a rake synthesizer circuit.

3. A spread-spectrum communication device according to claim 2, wherein said rake synthesizer circuit comprises a delay circuit with a plurality of tap outputs, a tap coefficient generator, a plurality of multipliers which multiplies said tap outputs of the delay circuit by corresponding outputs from the tap coefficient generator, and an adder which adds outputs from the multipliers, wherein the tap coefficient generator generates tap coefficients for maximizing S/N ratio in an output from the adder.

4. A spread-spectrum communication device according to claim 3, wherein said tap coefficients correspond to said correlation peaks in said despread signal so as to maximize said S/N ratio.

5. A spread-spectrum communication device according to claim 1, wherein said first, second and third circuits are in series, wherein said second circuit receives an output of said first circuit and said third circuit receives an output of said second circuit.

6. A spread-spectrum communication device according to claim 1, wherein said second circuit causes a group delay in said spread signal output from said second circuit.

7. A spread-spectrum communication device comprising:

a first circuit which receives a spread signal comprising symbols, a second circuit which limits a narrow-band interfering signal contained in said spread signal, and a third circuit which despreads said spread signal, wherein said second circuit comprises a variable amplification-factor amplifier and a magnetostatic filter which limits the level of the spread signal as well as the narrow-band interfering signal along a frequency axis, and wherein said third circuit comprises a matched filter which despreads said spread signal, thereby producing a plurality of correlation peaks corresponding to said symbols in said spread signal, and a delay synthesizing circuit, connected to said matched filter, which synthesizes a plurality of said correlation peaks derived from a single said symbol within the despread signal;

wherein said delay synthesizing circuit is a post-detection integrator receiver.

8. A spread-spectrum communication device according to claim 5, wherein said post-detection integrator receiver comprises a delay circuit which delays the despread signal by one interval between symbols in said spread signal, a multiplier which receives and multiplies said despread signal and said delayed despread signal, and an integrator which integrates the output of the multiplier over said one symbol interval.

9. A spread-spectrum communication device according to claim 8, wherein said integrator combines said correlation peaks within said one symbol interval with corresponding peaks within an adjacent symbol interval and outputs a phase difference.

10. A spread-spectrum communication device according to claim 9, further comprising a demodulator which receives the output of said integrator.

11. A spread-spectrum communication device according to claim 7, wherein said delay synthesizing circuit is a rake synthesizer circuit.

12. A spread-spectrum communication device according to claim 11, wherein said rake synthesizer circuit comprises a delay circuit with a plurality of tap outputs, a tap coefficient generator, a plurality of multipliers which multiply said tap outputs of the delay circuit by corresponding outputs from the tap coefficient generator, and an adder which adds outputs from the multipliers, wherein the tap coefficient generator generates tap coefficients for maximizing S/N ratio in an output from the adder.

13. A spread-spectrum communication device according to claim 12, wherein said tap coefficients correspond to said correlation peaks in said despread signal so as to maximize said S/N ratio.

* * * * *